No. 620,123. Patented Feb. 28, 1899.
A. J. GUSTAFSON.
BRACE FOR WAGON SPRINGS.
(Application filed Nov. 19, 1898.)

(No Model.)

Witnesses:

Inventor,
August J. Gustafson

UNITED STATES PATENT OFFICE.

AUGUST J. GUSTAFSON, OF MAYWOOD, ILLINOIS.

BRACE FOR WAGON-SPRINGS.

SPECIFICATION forming part of Letters Patent No. 620,123, dated February 28, 1899.

Application filed November 19, 1898. Serial No. 696,883. (No model.)

*To all whom it may concern:*

Be it known that I, AUGUST J. GUSTAFSON, a citizen of the United States, and a resident of Maywood, in the county of Cook and State of Illinois, have invented certain new and useful Improvements in Braces for Wagon-Springs, of which the following is a full, clear, and exact description, reference being had to the accompanying drawings and to the letters and numerals of reference marked thereon.

The object of my invention is to prevent the independent longitudinal jerky movement of spring-sustained bodies of wagons and similar vehicles, while at the same time allowing the springs thereof full play to permit of the vertical and lateral rocking movements of said body. This I accomplish by the mechanism hereinafter fully described and as particularly pointed out in the claims.

Figure 1:
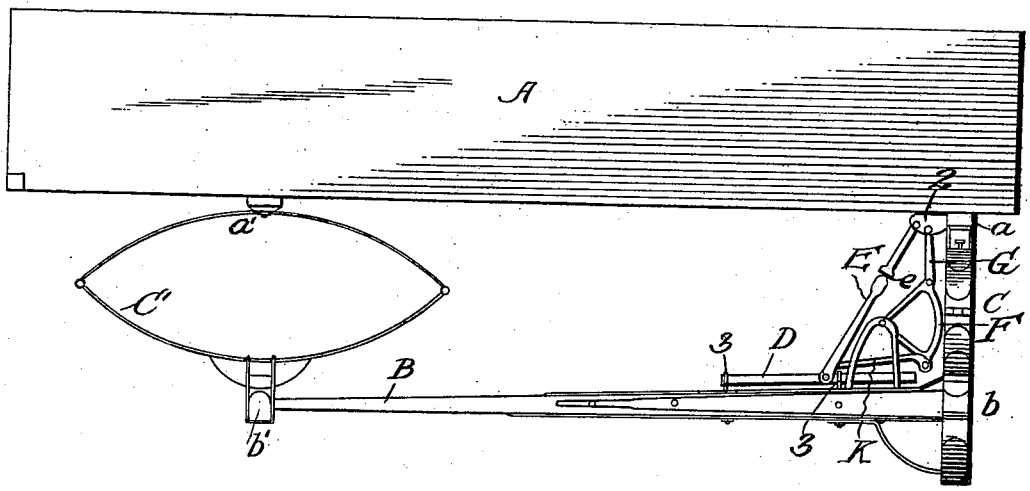
Figure 2:
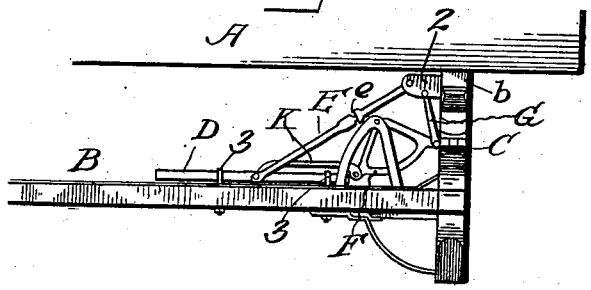

In the drawings, Figure 1 is a side view of a wagon-body and supporting-gear thereof, showing my invention applied thereto. Fig. 2 is a side elevation of the said supporting-gear of the body of the wagon, comprising the bolster, spring, axle, and reach, showing my invention applied thereto and showing the position of the elements thereof when the said spring is depressed.

In the drawings, A represents the body of a wagon. $a$ and $a'$ respectively represent the forward and rear bolsters thereof, and C represents the front spring and C' the rear spring supporting said bolsters $a$ and $a'$. The front spring C is seated upon and secured to the head-block $b$, which is connected to the rear axle $b'$ by the reach B, and the forward axle is pivotally connected to this head-block $b$ and provided with suitable fifth-wheel mechanism.

Now the irregular draft strain to which the wagon is subjected causes the body A to lurch forward in an objectionable manner. This I effectually prevent by mechanism that limits the resiliency or springy movement of the wagon-body to vertical and lateral planes. This mechanism consists of a longitudinally-reciprocal sliding bar D, which is connected by a suitable inclined brace E either to the wagon-body contiguous to the forward bolster A or directly or indirectly to said forward bolster by means of a rearwardly-projecting lug 2, and comprises link mechanism the direction of the forces of which always move in right-angular planes between the pivoted ends of the brace. The movement of the sliding bar D is directed by means of suitable guide-clips 3 3, the forward one of which is located at such a point as to limit the forward movement of said bar by reason of the lower pivoted end of the brace coming in contact therewith. Secured to and rising from the reach of the wagon, just in front of the forward guide-clip 3, is an inverted-V-shaped or other suitably-shaped upright supporting-frame, in the upper end of which a bell-crank F is fulcrumed, and pivotally connecting one of the arms of this bell-crank to the lug 2, adjacent to the upper pivotal point of the brace, is a link G. The lower arm of the bell-crank has the forward end of a link K articulating therewith, and the rear end of this link is pivotally connected to the sliding bar D at a point adjacent to the pivotal point of the lower end of the brace to said bar. The point at which I connect the brace to the bar D would cause it to interfere with link K. I prefer, therefore, to bifurcate the lower portion of the brace sufficiently to permit said link K to have free play between its bifurcations. The effect of the operation of the two lines of forces exerted upon the sliding bar D by the brace and the link mechanism is such as to absolutely prevent the objectionable longitudinal lurching of the body of the wagon either when the springs are expanded or depressed, either partially or to their full extent.

If desired, the brace E can be jointed at a suitable point along its length and the two resulting members united by a male and female screw-threaded connection $e$. This permits of the ready adjustment in length of the brace, so as to adapt it to the slight variation in the distances between the articulating-points of the parts of the link mechanism which is likely to occur when they are assembled for use in the manner hereinbefore described.

What I claim as new is—

1. In a wagon the combination with the body thereof, springs, and reach, connecting the supports of said springs, sliding bar reciprocating longitudinally on said reach, and an inclined brace pivotally connected at one end to the bolster of the wagon-body and at the other end to said sliding bar, as and for the purpose set forth.

2. In a wagon the combination with a wagon-body, the springs, and the reach connecting the supports of said springs, of a sliding bar reciprocating longitudinally on said reach, a bell-crank, a suitable frame to which said bell-crank is fulcrumed at a suitable point above the reach, a link connecting the lowermost arm of said bell-crank to said sliding bar, and a link connecting the uppermost arm of said bell-crank to or near the bolster of the wagon-body, as and for the purpose set forth.

3. In a wagon, a wagon-body, springs therefor, and a reach connecting the supports of said springs, in combination with a sliding bar reciprocal longitudinally on said reach, an inclined brace pivotally connecting the adjacent bolster of the wagon-body with said sliding bar, a bell-crank, a frame in the upper end of which said bell-crank is fulcrumed, a horizontally-disposed link connecting the lower arm of said bell-crank to said sliding bar, and a vertically-disposed link connecting the uppermost arm of the same to said wagon-body at a point at or near the said bolster, as and for the purpose set forth.

4. In a wagon, a wagon-body, springs therefor, and a reach connecting the supports of said springs, in combination with a sliding bar reciprocal longitudinally on said reach, a longitudinally-extensible inclined brace pivotally connecting said sliding bar with said wagon-body at or near the adjacent bolster thereof, a bell-crank, a supporting-frame therefor to which said bell-crank is suitably fulcrumed, a vertically-disposed link connecting the upper arm of said bell-crank to said wagon-body at a point at or adjacent to the upper pivoted end of said brace, and a horizontally-disposed link connecting the lower arm of said bell-crank to said sliding bar at a point at or adjacent to the lower pivoted end of said brace, as and for the purpose set forth.

AUGUST J. GUSTAFSON.

Witnesses:
WILLIAM PETTIS,
FRANK D. THOMASON.